Figure 5:
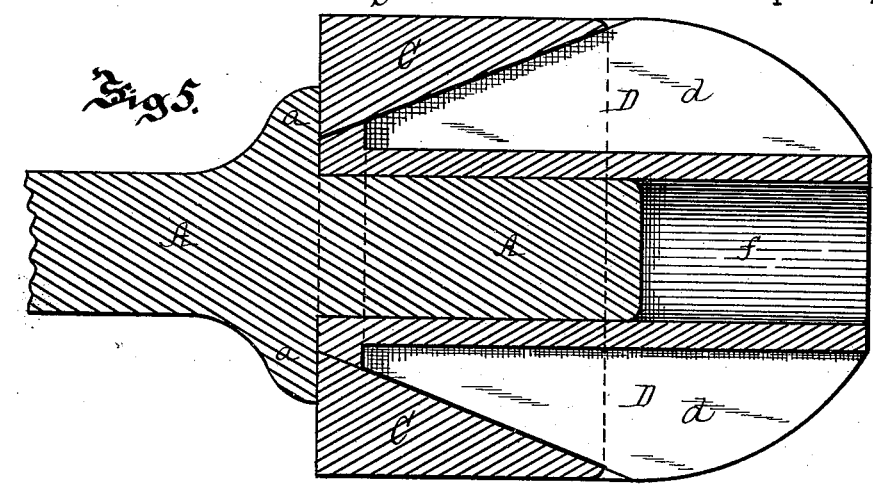

(No Model.) 2 Sheets—Sheet 1.
S. J. ADAMS.
TUBE WELDING BALL.
No. 361,566. Patented Apr. 19, 1887.
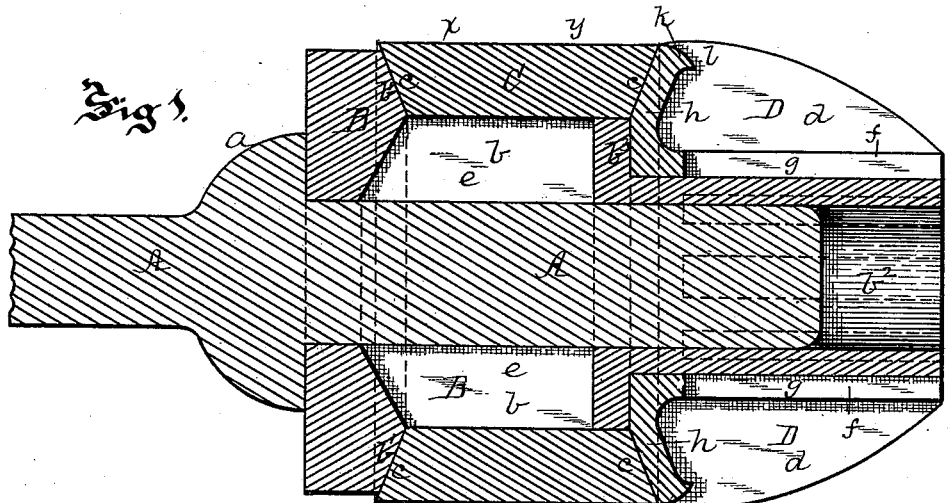
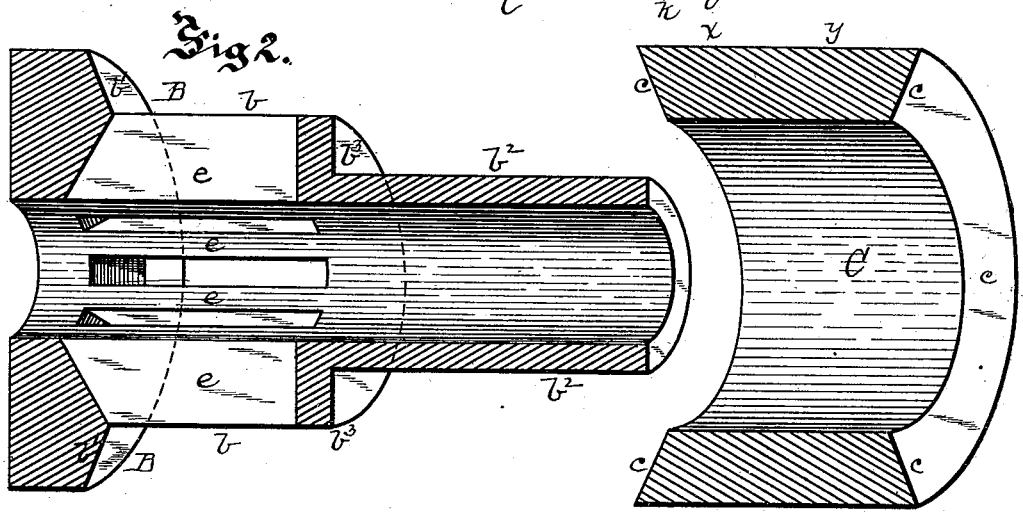
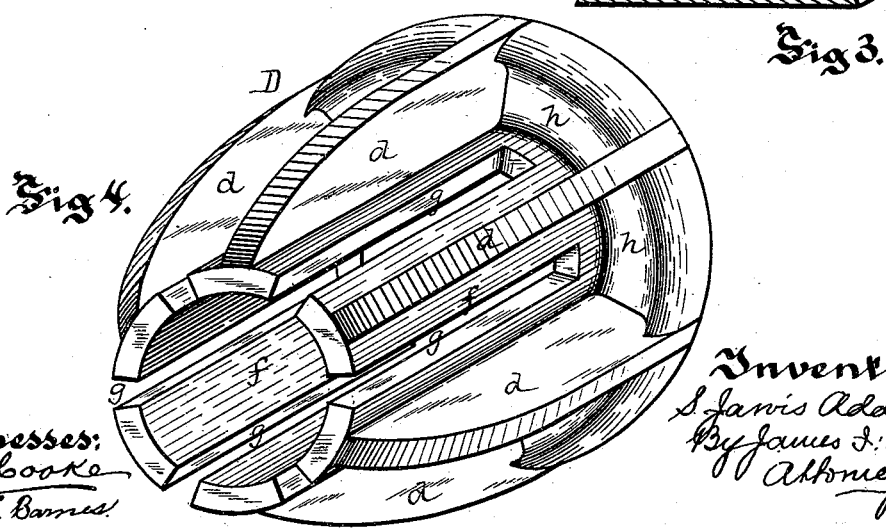
Witnesses:
J. H. Cooke
T. E. Barnes
Inventor.
S Jarvis Adams
By James I. Kay
Attorney (No Model.) 2 Sheets—Sheet 2.

S. J. ADAMS.
TUBE WELDING BALL.

No. 361,566. Patented Apr. 19, 1887.

Witnesses:
J. N. Cooke
T. E. Barnes

Inventor.
S. Jarvis Adams
By James I. Kay
Attorney

UNITED STATES PATENT OFFICE.

S. JARVIS ADAMS, OF PITTSBURG, PENNSYLVANIA.

TUBE-WELDING BALL.

SPECIFICATION forming part of Letters Patent No. 361,566, dated April 19, 1887.

Application filed November 15, 1886. Serial No. 218,875. (No model.)

*To all whom it may concern:*

Be it known that I, S. JARVIS ADAMS, of Pittsburg, in the county of Allegheny and State of Pennsylvania, have invented a new and useful Improvement in Tube-Welding Balls; and I do hereby declare the following to be a full, clear, and exact description thereof.

My invention relates to pipe-welding balls, these balls being employed in the manufacture of wrought-metal pipe or tubing, and the balls being supported at the end of a long rod between welding-rolls, the tubing to be formed being first bent into the form of skelp, and then pushed from the furnace around the ball and being compressed and welded by the rolls, the ball forming the anvil for welding the same. These balls, as heretofore commonly employed, have been formed of a single piece, even though they were employed for the manufacture of the largest tubing, and as in late years the size of tubing formed has been greatly increased, these balls have been found to be exceedingly hard to handle, it being necessary to employ hoisting apparatus to lift them onto the supporting-rod, or onto the lathe in which they were turned, the balls in some cases for large tubing weighing from one hundred and fifty to two hundred and fifty pounds. These heavy balls were also found to bend down the supporting-rod, and by their pressure on the lower portion of the tubing welded around them act to scar or thin such portion, and in some cases they have rendered the tubing imperfect.

In the manufacture of tubing it is well known that skelp must be fed to the rolls as soon as it is brought to the proper heat, as in case it becomes overheated it is liable to sag out of shape within the furnace, or the metal thereof to become burned under the intense heat generated within the furnace, while at the same time it is necessary that the metal be brought to a perfect welding-heat, in order that a perfect weld may be formed between the lapping edges of the skelp, so that it is necessary to feed the skelp to the welding-rolls as soon as properly heated. In forming this large tubing where it was necessary to handle these exceedingly-heavy balls it sometimes happened that after one welding operation the ball could not be placed in position for the next welding operation quickly enough, so that the skelp became overheated and sagged out of shape, or the metal thereof was burned, and as these large tubes are formed from exceedingly-large plates of metal the loss from this cause is considerable. Where these balls were formed in one piece, it was also found that the welding operation could be practicably accomplished only at one point thereon, and though the balls were of this great weight, after a few welding operations they were rendered unfit for use, and it was necessary to remelt the entire ball, even though the forward end of the ball and other parts thereof were not worn or injured.

The object of my invention is to provide a welding-ball for the manufacture of large tubing, in which substantially all these objections are overcome; and it consists, essentially, in forming the welding-ball with a removable point, so that, as the ball is formed in separate pieces, the parts are all of them light enough to be easily handled by the workmen, and they can be raised and placed on the supporting-rod without the employment of machinery for that purpose, while at the same time this removable point can be used in connection with the manufacture of a large amount of tubing, it being only necessary to replace the welding portion of the ball, which may be formed of a ring or sleeve, and on which the entire welding operation occurs.

It also consists in providing the ball with a reversible welding-sleeve, which sleeve can be reversed after the welding operation, so that the weld can be formed on different points thereon, and the sleeve employed in welding a large number of pipes or tubes.

It also consists in combining with the removable point and welding-sleeve an enlarged head to fit onto the supporting-rod and support the welding-sleeve and point, so that the welding-sleeve need not be formed of greater thickness than is necessary to sustain the welding-pressure and prevent the cutting of the sleeve by the heated skelp.

It also consists in forming the rear portion of the removable point slightly larger than the welding portion of the ball, in order to open out the skelp and present it to the welding portion in proper position for welding, the rolls acting to weld it more perfectly when it is expanded to its full diameter just before the welding operation takes place.

It also consists in certain details of construction, as hereinafter specifically set forth.

To enable others skilled in the art to make and use my invention, I will describe the same more fully, referring to the accompanying drawings, in which—

Figure 1 is a longitudinal central section of a ball embodying the same. Figs. 2, 3, and 4 are views of the enlarged head, the welding-sleeve, and the removable point of the ball; and Figs. 5, 6, and 7 are longitudinal sections of the other forms of balls embodying my invention.

Like letters of reference indicate like parts in each.

The form in which I prefer to employ my invention is shown more particularly in Figs. 1 to 4, and will be specifically described in connection with the said figures.

Figure 6:
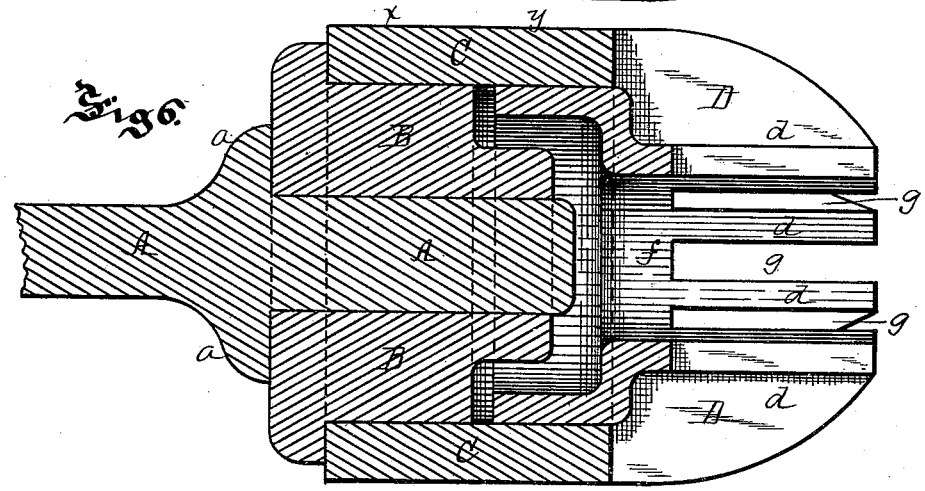
Figure 7:
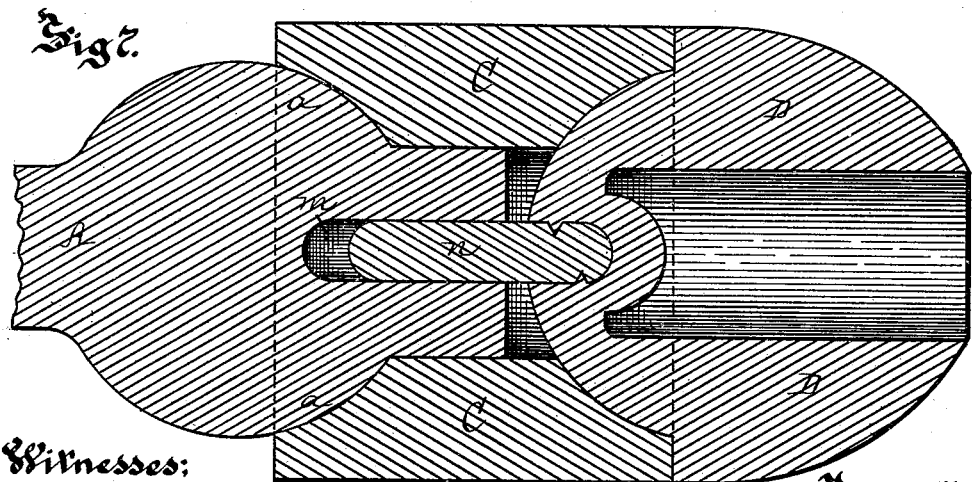

The supporting-rod or mandrel A is provided with the shoulder $a$, to sustain the longitudinal strain during the welding operation, the welding portion of the ball either fitting directly against this shoulder, as in Figs. 5 and 7, or, as preferred by me, the enlarged head B fitting against this shoulder, while the welding-sleeve C fits around the head B. Supported on the mandrel, as in Figs. 5 and 7, or on the enlarged head, as in Fig. 1, or by the welding-sleeve, as in Fig. 6, is the removable point D, by means of which the skelp to be welded is directed upon the welding portion C, this removable point D being preferably employed, as shown in Fig. 1.

As it is desirable that the point of the ball shall have a long taper to direct the skelp onto the welding portion, I provide the head B with the enlarged cylindrical portion $b$ in front of the shoulder $b'$, on which the welding-sleeve C fits, and reduce the portion $b^2$, on which the removable point fits, a shoulder, $b^3$, being thus formed to sustain any longitudinal pressure on the removable point.

The welding-sleeve C is an annulus of sufficient thickness to sustain the pressure of the rolls in welding and to prevent the heating of the sleeve and the cutting or scoring of the same to any extent by the heated skelp. The sleeve is formed of such length that the tube can be welded at two or more points in the length thereof. For instance, in the sleeve shown in Figs. 1 and 3 the welding operations can occur at the points $x\ y$ thereon, the sleeve after one welding operation being reversed so as to present a perfect surface for another welding operation on the same line of surface as the last used, as shown, and in Fig. 6 the welding operations can occur at the points $x\ y$, this sleeve being reversed in the same manner as that shown in Fig. 1.

In order to give a better support to the welding-sleeve and a greater width of welding-face in proportion to the length of the ball, the end faces of the welding-sleeve are formed inwardly-tapering, as at $c$, these welding-faces fitting against correspondingly-shaped shoulders on the head and on the removable point, and receiving a full support therefrom, which, when the skelp or pipe passes over, brings everything together rigidly, centrally, and firmly, while the length of the ball can be reduced in proportion to the difference between the width of the outer and inner faces of the welding sleeves.

In order to bind the parts of the ball together during the welding operation, the end faces, $c$, of the welding-sleeve may be formed outwardly-tapering from the periphery, but this necessarily increases the length of the ball. As is well known in the manufacture of tubing, after the welded tube is passed over the ball in order to withdraw the supporting-rod it is necessary that the shoulder or the portion supporting the welding part of the ball shall not be of such size as might strike and hold against the welded tube, and this has been one of the reasons why the balls employed before have been formed in a single piece; but as the enlarged head $d$ is simply slipped upon the supporting-rod, when this rod is drawn back and the tube strikes against the ball this enlarged head is pushed off with the other parts of the ball, so that the rod can be withdrawn in the same manner as if the ball were formed of but one piece. By the employment of this head I am thus enabled to employ only such a thickness of welding-tubing as is sufficient to sustain the pressure in welding and prevent the cutting thereof and at the same time to permit of the easy withdrawal of the supporting rod.

In order to lighten the ball, as it is desirable to have only such weight therein as is necessary to give the proper strength to the parts thereof, I have formed the enlarged head B skeleton in shape, the enlarged portion $b$ being formed of a series of ribs, $e$, which impart thereto sufficient strength to support the ball and at the same time greatly reduce the weight of the head B. If desired, the head may be cored out in another way, it only being necessary for it to act to hold the welding-ring in position and support it against a longitudinal strain or pressure in welding.

The construction of removable point preferred by me is fully shown in Figs. 1 and 4, this point being made as light as possible, as there is practically no heavy strain thereon, and the point being made skeleton in shape so as to lighten it as far as possible. The point D is formed of a series of ribs, $d$, extending out from the tubular portion $f$, which fits onto the extension $b^2$ of the enlarged head, and in order to further lighten the ball a series of slots, $g$, extend into the tubular portion $f$ from the forward end, the tubular portion being united at the rear end of the point, and a web, $h$, extending from said tubular portion up between the central ribs $d$, to support them at the point of largest diameter, and also for the further purpose of providing curved faces $k$, to raise the skelp and direct it onto the welding portion C of the ball, in case it should sag between the ribs as it passes over the removable point, these curved faces acting to lift the edge of the skelp and direct it onto the welding portion and prevent the forward edge of the skelp from striking against any square shoulder, which might bend it out of shape before it passes the point where it is welded.

In order to stretch the skelp to its full diameter before it passes onto the welding portion of the ball, I prefer to form the removable point of slightly greater diameter at its rear end, this being shown at $l$, and as the skelp passes onto the ball, in order to pass over the enlargements $l$ thereon, it is necessarily stretched to its full diameter, so that as the welding-edges are pressed together around the ball they are brought into proper position to lap and weld perfectly, practical experience showing that this is an important advantage in the formation of lap-weld tubing.

In the pipe-welding ball shown in Fig. 5, instead of the employment of an enlarged head, I have formed the welding portion of the ball triangular in shape, it being thickest at the rear portion thereof, so that its inner edge will bear against the shoulder $a$ on the supporting-rod A, and at the same time sufficient metal for sustaining the pressure of welding, &c., is provided at the rear portion of the welding-sleeve, as at $x$, and as it decreases in thickness toward the forward edge the sleeve can be made light, while at the same time it provides sufficient metal to sustain the welding-pressure and prevent cutting during welding. The rear portion of this point extends within the sleeve and supports the same, the rear end of the point pressing against the shoulder $a$ of the supporting-rod, and as the point is formed of a series of ribs, as before described, a light ball is obtained, and one in which the parts can be easily handled in placing them on the mandrel. This ball forms the subject-matter of another application for patent of even date herewith, Serial No. 218,876.

The welding-ball shown in Fig. 6 is substantially the same as that shown in Fig. 1, except that the removable point extends into the sleeve C and has a tubular extension fitting within the same, the point being thus supported by the sleeve.

In the construction shown in Fig. 7 the shoulder on the supporting-rod is formed curved, and the rod has formed therein a seat or hole, $m$, into which a pin, $n$, on the removable point enters, and by means of which the removable point is supported, the removable point and shoulder on the supporting-rod fitting into the welding-sleeve.

The removable points shown in Figs. 5 and 6 are skeleton in form, and are made much lighter than the body of the ordinary ball, containing substantially all the advantages heretofore described as to the removable point shown in Figs. 1 and 4, these modifications of the invention being illustrated to show the different forms in which it can be employed.

When my improved welding-ball is in use, in order to arrange the ball upon the supporting rod, the head B is first slipped onto the rod, the welding sleeve C then slipped onto the enlarged portion $b$ of the head and against the shoulder $b'$ thereof, and the removable point D is then slipped onto the reduced tubular portion $b^2$ of the head and against the shoulder $b^3$ thereof, these parts all being sufficiently light to enable any ordinary workman to place them in position, so that, instead of requiring the employment of hoisting apparatus to raise the ball and assist in placing it on the supporting-rod, the parts may be rapidly placed in position thereon, none of the welding parts being too heavy for easy handling. After the rod has been advanced between the rolls and the skelp is brought to the necessary heat for welding, the skelp is pushed forward in the ordinary manner, and is directed by the ribs of the tapering point onto the welding-sleeve, the skelp being first stretched to its full size by the enlarged portion $l$ of the point, so that as the rolls catch it they can press the lapping edges into proper position before compressing them onto the welding-sleeve C, and in case the free edges of the skelp, or any portion of the forward end thereof, should sag down it will pass up the curved faces $k$ between the ribs, so that there is no liability of its catching on any portion of the removable point. The pipe is then welded, the pressure of the rolls acting upon the welding-sleeve, either at the rear end or the forward end, as desired, and the pipe passing off the ball onto the mandrel. As the supporting-rod is then drawn back to remove the welded tube therefrom, the pressure of the tube against the rear end of the enlarged head presses the three different parts in the ball off the supporting-rod, so that the tube can be easily withdrawn. To arrange the ball for forming another tube, all that is necessary is to slip on the enlarged head, reverse the sleeve so as to present the surface near the other end for welding, and slip on the point and advance the rod so as to bring the ball between the welding-rolls.

In case the point and enlarged head becomes overheated during the welding operation, they can be laid aside and other like parts employed; but the entire wear comes upon the welding-sleeve, and the removable point and head may be employed over and over again, so that the only cost in welding is for the welding-sleeve, which can be used to a much greater extent than the ordinary welding-ball when made in one piece, and the welding-sleeve costs much less than the ordinary welding-ball, the cost of welding by the use of these balls being thus largely reduced.

As the balls are made in two or more pieces, they can, as above set forth, be easily placed in position by an ordinary workman, and without the use of hoisting apparatus, so that the time necessary to secure them in place is much less than with the heavy balls heretofore used, and there is no liability of injury to the skelp when in the furnace, on account of the time required to adjust the ball in place.

As the removable point and enlarged head do not receive any appreciable wear, they can be made in skeleton form, and very light, as above described, and at the same time the skeleton point forms a receptacle for the slag or scale within the skelp, and prevents it from being pressed between the rolls and welding-ball and injuring the tubing.

In case the ball becomes stuck within the pipe, as often occurs in the manufacture of tubing, the removable point and the enlarged head can be withdrawn therefrom, leaving only the welding-ring, and this welding-ring, when unsupported, can be easily crushed under a steam-hammer without injuring the metal of the tube or skelp, so that it can be reheated and welded, so preventing the necessity of cutting the pipe and forming short lengths of tubing. This constitutes an important advantage in my improved ball, as the tapering forward end of the ordinary ball is the hardest part to crush, since it cannot be subjected to the blow of the hammer without compressing and injuring the tube-skelp, and in my improved ball it can be withdrawn, so that there is nothing to crush except the welding-sleeve. As the welding ring or sleeve is formed of only the sufficient thickness to sustain the welding-pressure and prevent the cutting of the metal, and this is the only part subject to wear, it is evident that my improved ball is much less expensive than where the ball is made in one piece, and when worn out the whole ball is necessarily remelted and recast.

What I claim as my invention, and desire to secure by Letters Patent, is—

1. A pipe-welding ball having a removable point or tapering forward end, substantially as and for the purposes set forth.

2. A pipe-welding ball having a skeleton removable point or tapering forward end, substantially as and for the purposes set forth.

3. A pipe-welding ball having a removable point or tapering forward end provided with a series of ribs to guide the skelp onto the welding portion of the ball, substantially as and for the purposes set forth.

4. A pipe-welding ball having a removable point or tapering forward end formed of a series of ribs, and having webs between the ribs provided with curved faces, substantially as and for the purposes set forth.

5. A pipe-welding ball having a removable point or forward end formed of a slotted tubular sleeve, and a series of ribs extending up from said sleeve, substantially as and for the purposes set forth.

6. A pipe-welding ball provided with a removable reversible welding-sleeve, substantially as and for the purposes set forth.

7. A pipe-welding ball provided with an enlarged head fitting on the supporting-rod, and a welding-sleeve and removable point both fitting onto the enlarged head.

8. A pipe-welding ball having an enlarged head for supporting a welding-sleeve, said enlarged head being skeleton in form, substantially as and for the purposes set forth.

9. A pipe-welding ball having a removable point and a reversible welding-sleeve, said sleeve having tapering end faces, and the end face of the removable point corresponding thereto, substantially as and for the purposes set forth.

10. A pipe-welding ball having a removable point and a reversible welding-sleeve, said sleeve having inwardly-tapering end faces, and the end face of the point corresponding thereto, substantially as and for the purposes set forth.

11. A pipe-welding ball having a removable point or tapering forward end, the rear portion of said removable point being of greater diameter than the welding portion of the ball, substantially as and for the purposes set forth.

In testimony whereof I, the said S. JARVIS ADAMS, have hereunto set my hand.

S. JARVIS ADAMS.

Witnesses:
JAMES I. KAY,
J. N. COOKE.